United States Patent [19]

Bartholomew

[11] Patent Number: 4,683,917

[45] Date of Patent: Aug. 4, 1987

[54] FLEXIBLE PRESSURE-CONFINING CONDUIT ASSEMBLY

[75] Inventor: Donald D. Bartholomew, Marine City, Mich.

[73] Assignee: Proprietary Technology, Inc., Southfield, Mich.

[21] Appl. No.: 770,233

[22] Filed: Aug. 28, 1985

[51] Int. Cl.⁴ ............................................. G05D 11/00
[52] U.S. Cl. ..................................... 138/121; 138/109; 138/173; 138/DIG. 8; 285/903
[58] Field of Search ............... 138/137, 109, 121, 122, 138/129, 135, 155, 154, 173, 131; 285/226, 903

[56] References Cited

U.S. PATENT DOCUMENTS

| | | |
|---|---|---|
| 536,417 | 3/1895 | Brooks . |
| 956,077 | 4/1910 | Greenfield . |
| 992,426 | 5/1911 | James . |
| 996,899 | 7/1911 | Witzenmann . |
| 1,409,697 | 3/1922 | Fulton . |
| 2,150,471 | 3/1939 | Van Vulpen ........................ 285/149 |
| 2,321,231 | 6/1943 | Missmer . |
| 2,394,270 | 2/1946 | Swain . |
| 2,402,003 | 6/1946 | Zublin . |
| 2,449,369 | 9/1948 | Doane et al. ........................ 138/121 |
| 2,759,765 | 8/1956 | Pawley . |
| 2,797,474 | 7/1957 | Main, Jr. .............................. 285/149 |
| 2,818,636 | 1/1958 | Fentress et al. ...................... 138/173 |
| 2,898,941 | 8/1959 | Kilcup . |
| 2,991,093 | 7/1961 | Guarnaschelli ...................... 285/149 |
| 3,015,969 | 1/1962 | Bratz . |
| 3,060,069 | 10/1962 | Sindars . |
| 3,068,946 | 12/1962 | Frisby et al. . |
| 3,186,438 | 6/1965 | Holmgren ........................... 138/173 |
| 3,549,176 | 12/1970 | Contreras . |
| 3,623,513 | 11/1971 | Dinkelkamp ........................ 138/135 |
| 3,638,973 | 2/1972 | Poletti . |
| 3,831,636 | 8/1974 | Bittner ................................. 138/114 |
| 3,847,184 | 11/1974 | God . |
| 3,857,415 | 12/1974 | Morin et al. ........................ 138/122 |
| 3,929,164 | 12/1975 | Richter . |
| 3,929,165 | 12/1975 | Diebolt et al. . |
| 3,930,419 | 1/1976 | Kramer . |
| 4,063,757 | 12/1977 | Fuhrmann .......................... 285/903 |
| 4,086,665 | 5/1978 | Poirier ................................. 138/121 |
| 4,089,351 | 5/1978 | Ward ................................... 138/109 |
| 4,111,466 | 9/1978 | Derigibus . |
| 4,172,474 | 10/1979 | Stahl . |
| 4,175,992 | 11/1979 | Grawey . |
| 4,326,561 | 4/1982 | Kutnyak .............................. 138/109 |
| 4,344,462 | 8/1982 | Aubert et al. ....................... 138/122 |
| 4,437,691 | 3/1984 | Laney ................................. 285/903 |
| 4,445,332 | 5/1984 | Thies et al. ......................... 285/226 |

FOREIGN PATENT DOCUMENTS

| | | | |
|---|---|---|---|
| 405672 | 10/1970 | Australia ............................. 138/109 |
| 2142068 | 8/1971 | Fed. Rep. of Germany ...... 138/109 |
| 2405121 | 8/1975 | Fed. Rep. of Germany ...... 138/109 |
| 872908 | 7/1961 | United Kingdom ............... 138/109 |
| 955001 | 4/1964 | United Kingdom ............... 138/109 |

*Primary Examiner*—Stephen Marcus
*Assistant Examiner*—Leo J. Peters
*Attorney, Agent, or Firm*—Harness, Dickey & Pierce

[57] ABSTRACT

A tubular conduit assembly for confining or conveying a pressurized fluid including a flexible, thin-walled inner tube coaxially disposed within a flexible armor or outer tube. The outer tube is preferably constructed from one or more helically-wound members corresponding with, and engaging, helical corrugations on the inner tube. The inner tube deforms in response to the pressure and/or temperature of the fluid in order to form an internal sealing layer or sleeve-type coating for the outer tube. A shrink fitting assembly is also disclosed, which is adapted for compressingly urging the conduit assembly into an anchored, sealing relationship with a nipple member or other connection device inserted within an open end of the conduit assembly.

10 Claims, 8 Drawing Figures

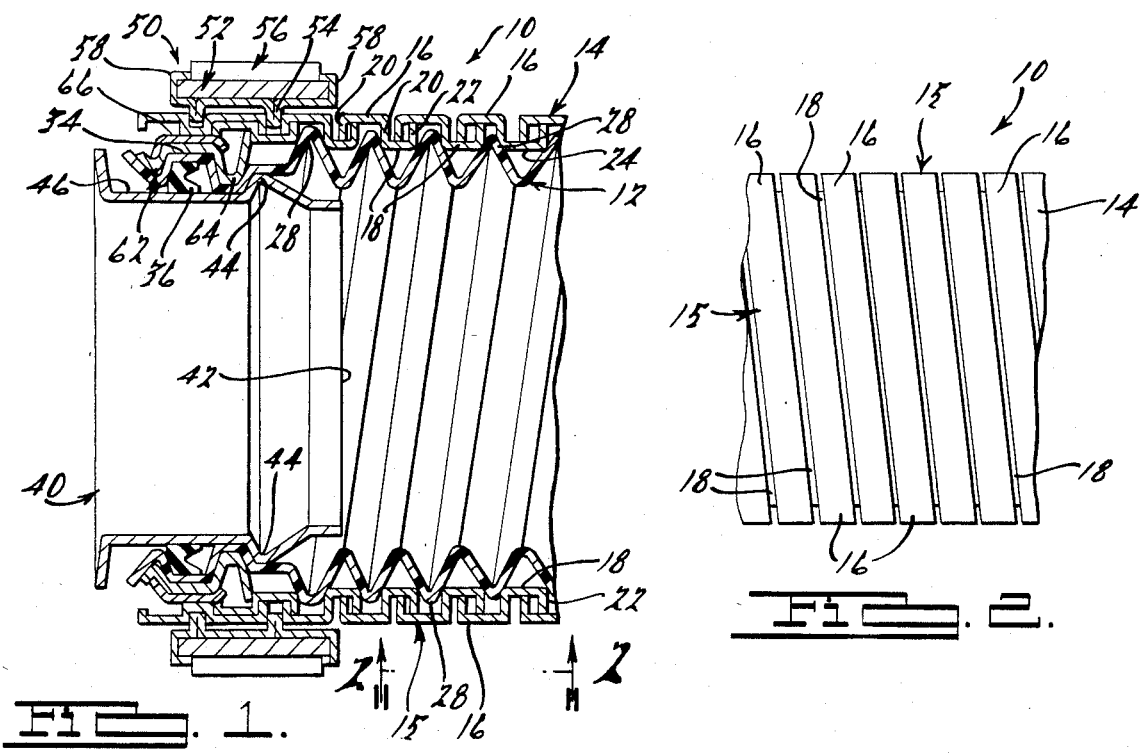
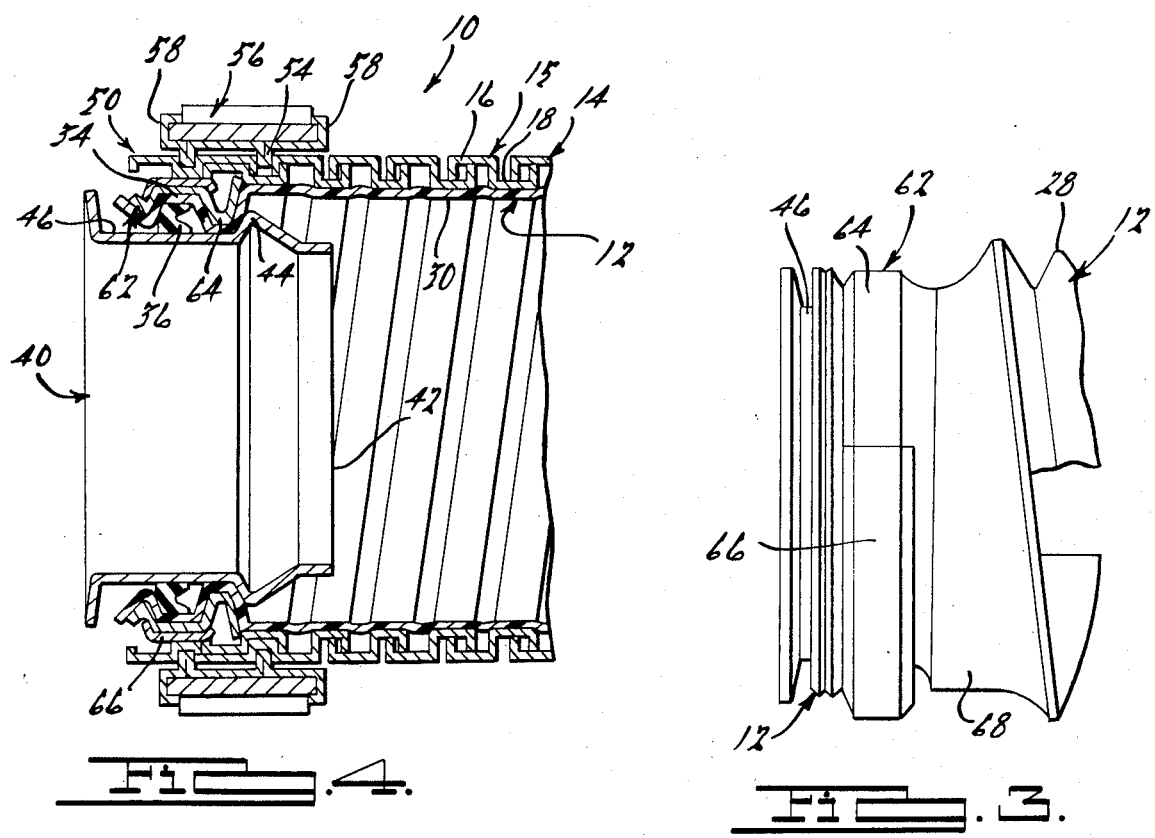

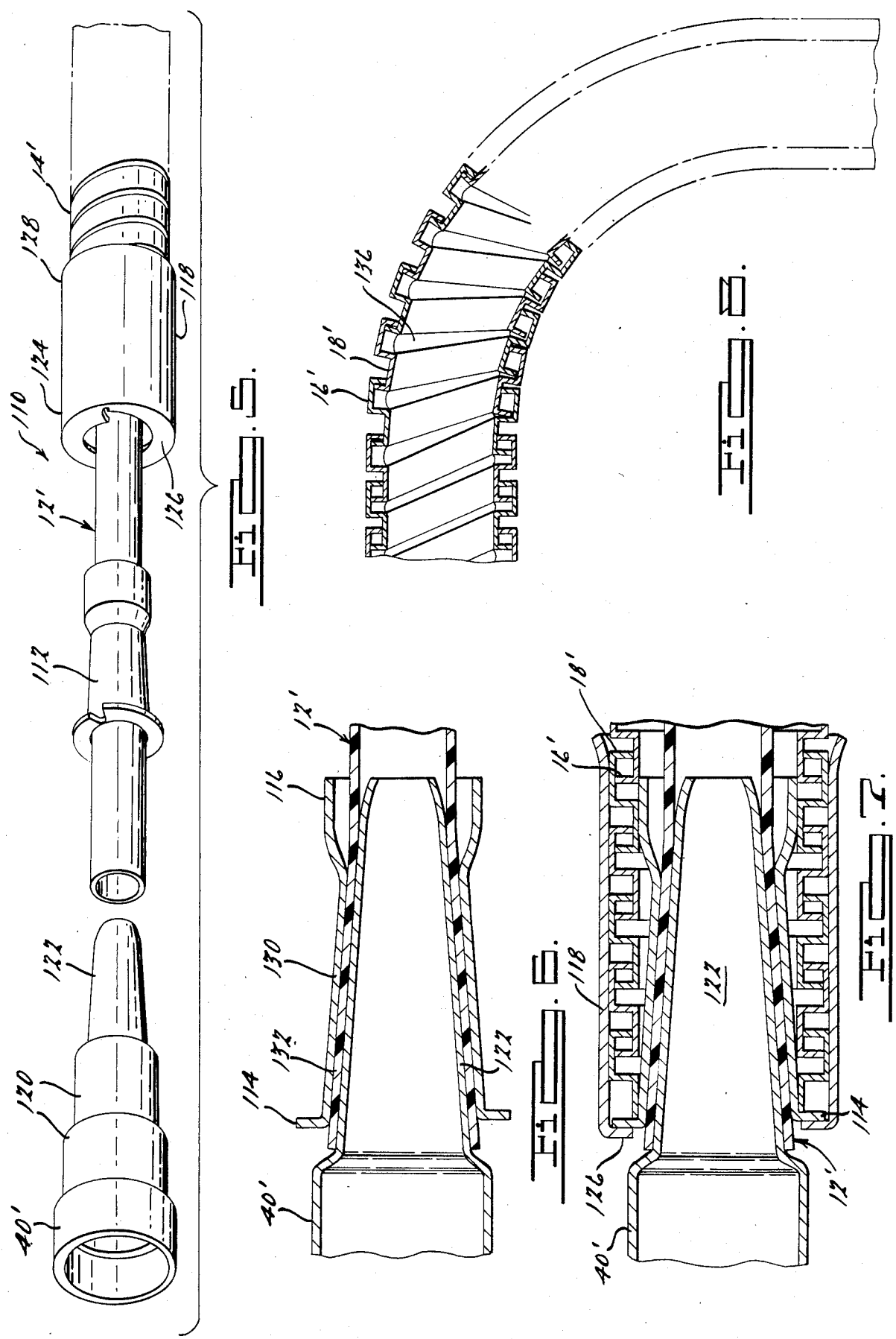

FLEXIBLE PRESSURE-CONFINING CONDUIT ASSEMBLY

BACKGROUND AND SUMMARY OF THE INVENTION

The present invention relates generally to conduits for conveying fluids, and particularly to a flexible conduit assembly for conveying a pressurized fluid.

Various automotive and industrial fluids, such as water, fuel, hydraulic and engine oil, and refrigerant, for example, are typically conveyed from one component to another. Frequently such fluids must be conveyed under somewhat severe flow parameters or environmental conditions, such as high pressures, widely varying fluid and ambient temperatures, dirt, dust and vibration. Additionally, space is usually at a premium in such automotive and industrial applications, and the pipe or conduit conveying the fluid is often required to follow a tortuous path with several bends of different angles along its length. Further adding to the complexity of such installations, the size, weight and cost of the pipe or conduit should be minimized, while its reliability is maximized. Accordingly, it is a principal object of the present invention to provide a high-strength flexible conduit or piping structure which will both satisfy the above requirements and yet be economical and simple to manufacture and install.

In accordance with the present invention, a tubular conduit assembly for conveying a pressurized fluid preferably includes a flexible, thin-walled plastic inner tube disposed coaxially within a generally coextensive flexible outer tube which functions as a high-strength armor structure for the assembly. The thin-walled plastic inner tube preferably includes one or more helically-extending corrugations to further enhance its flexibility, and the flexible outer tube or armor is preferably constructed from at least one helically-wound, high-strength member. The helical corrugations of the inner tube and the helically-wound member or members of the outer tube or armor have a corresponding, generally coextensive configuration and engage one another in a manner similar to the threadable engagement of bolt within a nut. The flexible inner tube, is preferably a thermoplastic or other material suitable for the conditions and chemistry of the fluid being confined and conveyed, and is sufficiently flexible and thin-walled to be deformed by the pressure and/or temperature of the fluid in order to form a sealing layer or coating on the interior of the outer tube.

In the preferred embodiment, the outer tube is constructed of a high-strength, helically-wound member having two or more generally oppositely-presenting channel-shaped, portions which are interlaced in a slidably interlocking configuration. Since the generally channel-shaped portions have opposite presentations, each of the channel-shaped portions has one of its legs slidably interposed between the legs of the adjacent channel-shaped portion in order to provide the interlocking, but flexible, structure. Thus, when the flexible inner tube deforms in response to the pressure and/or temperature of the fluids being conveyed, it provides a fluid-tight internal layer or sleeve which internally seals the helically-wound member or members of the outer tube without sacrificing the flexibility thereof.

The preferred tubular conduit assembly also includes an annular portion located adjacent an end of the flexible inner tube adapted to be connected to a fluid containing component. Such a fluid-containing component may have a nipple member, for example, which is insertable into an open end of the conduit assembly. In such an arrangement, a shrink fitting is provided for compressingly urging the annular portion of the inner tube into a sealing relationship with the nipple member and also for anchoring the flexible outer tube with respect to the nipple member. The shrink fitting preferably includes an external collar threadably and coaxially disposed around the helically-wound channel-shaped member or members of the outer tube. As the collar is threaded into a circumscribing relationship with the outer and inner tubes and the nipple member, the annular portion on the end of the inner tube is sealingly compressed. The annular portion may also be generally channel-shaped and include a sealing member therein.

Additional objects, advantages and features of the present invention will become apparent from the following description and the appended claims, taken in conjunction with the accompanying drawings.

BRIEF DESCRIPTION OF THE DRAWINGS

FIG. 1 is a longitudinal cross-sectional view of a tubular conduit assembly according to the present invention.

FIG. 2 is an external elevation view of a portion of the conduit assembly, taken generally along line 2—2 of FIG. 1.

FIG. 3 is an elevational view, partially broken away, similar to FIG. 1, but with the outer tube and the shrink fitting collar removed to reveal the internal components of the connection to the nipple member.

FIG. 4 is a longitudinal cross-sectional view, similar to that of FIG. 1, but illustrating the flexible inner tube in its deformed condition, functioning as an internal sealing layer or sleeve.

FIG. 5 is a perspective view of a second embodiment of a tubular conduit assembly according to the present invention.

FIG. 6 is a longitudinal cross-sectional view of a nipple member of a second embodiment.

FIG. 7 is a longitudinal cross-sectional view of a second embodiment of a tubular conduit assembly.

FIG. 8 is a longitudinal cross-sectional view of a conduit of a second embodiment.

DETAILED DESCRIPTION OF THE PREFERRED EMBODIMENTS

FIGS. 1 through 4 of the drawings, along with the following description, illustrate and depict exemplary embodiments of a flexible pressure-confining conduit assembly according to the present invention as installed on a nipple member of a fluid-carrying or fluid-containing device for purposes of illustration only. One skilled in the art will readily recognize from the following discussion that the principles of the invention are equally applicable to various other fluid installations, and to fluid conduit assemblies other than those shown in the drawings.

In FIG. 1, a tubular conduit assembly 10 includes a flexible, thin-walled inner tube 12 and a flexible armor or outer tube 14 coaxially disposed around the inner tube 12. The outer tube 14 is constructed of one or more high-strength members wound in a helical configuration to form a cylindrical or tubular configuration, similar to the armored cable commonly referred to in the electrical industry as "Greenfield cable". In the preferred embodiment, the outer tube 14 is composed of a helically-wound metal member 15, having alternating inwardly-presenting channel-shaped portion 18 shown in FIG. 1. The channel-shaped portions 16 and 18 are interlaced and slidably interlocked, as shown in FIGS. 1, 2, and 4, such that each leg 20 of the portion 16 is received between the legs 22 of the adjacent portion 18 and each leg 22 is received between the adjacent legs 20. Such a construction provides a relatively smooth, non-snagging sectional interior surface 24 for the outer tube 14 which is adapted to contact and control the shape of the inner tube 12. The legs 20 and 22 of the oppositely-presenting channel-shaped portions 16 and 18 together in such a manner that the legs slidably engage one another to allow the outer tube 14 to be flexible and to be readily bendable to the required shape and configuration of the conduit assembly. The thickness of the material of the preferred metal member 15, from which the channel-shaped portions 16 and 18, are formed is generally in the range of approximately 0.008 inch to approximately 0.015 inch in thickness, which also contributes to the flexibility of the outer tube 14. It should be understood, however, that the particular construction of the outer tube 14 described herein and illustrated in the drawings is intended to be exemplary only, and that other flexible, high-strength configurations may alternately be employed. It should also be understood that the outer tubing may be composed of metal, high-strength plastic, or other high-strength and impact-resistant materials known to those skilled in the art.

The inner tube 12, which is preferably composed of a relatively low-strength, very thin-walled plastic, is contained, reinforced, and armored by the outer tube 14. The inner tube 12 includes one or more substantially continuous, helical corrugations 28 that correspond in their helical configuration with the channel-shaped members 16 and 18 of the outer tube 14 and engage them in a thread-like manner. The low-strength, thin-walled plastic construction of the inner tube 12 allows it to deform in response to the pressure and/or temperature of the fluid, as shown in FIG. 4, in order to form an internal sealing sleeve or layer 32 which functions as a fluid-tight coating for the flexible outer tube 14. Thus, while the inner tube 12 may not itself possess sufficient strength to contain a high pressure and/or high temperature fluid, the high-strength outer tube 14 protects and contains the inner tube 12 and resists excessive outward expansion thereof.

In a preferred construction of the present invention, the wall thickness of the inner tube 12 is generally in the range of approximately 0.010 inch to approximately 0.030 inch in thickness, which combined with the helically-corrugated shape yields a very flexible inner member. The particular plastic material used to fabricate the interior tube 12 may be selected by those skilled in the art to have environmental and chemical resistance to the fluid being confined and to have the required characteristics to deform as described above. Such a construction also provides for a tubular conduit assembly that is lighter in weight and lower in cost than a conventional formed rubber reinforced hose and which has a longer service life since the plastic inner tube does not deteriorate when exposed to various fluids and environments as readily as does rubber. Furthermore, the preferred metal outer tube 14 is highly resistant to chafing or cutting damage resulting from contact with other adjacent components.

The conduit assembly 10 is shown in the drawings connected to a nipple member 40 of a fluid-containing device, for purposes of illustration. The nipple member 40 is generally of the type typically found on equipment such as automobile radiators, heat exchangers, and the like. The nipple member 40 includes an open end 42, a ramped bead 44, and a cylindrical portion 46. A shrink fitting assembly 50 is provided, as illustrated in FIGS. 1, 3, and 4 for compressingly urging the inner tube 12 into a sealing relationship with the nipple member 40 and for anchoring the outer tube 14 with respect thereto.

In the preferred arrangement of the present invention, the inner tube 12 includes an integral annular portion 34 adjacent its open end which is to be connected to the nipple member 40. The annular portion 34 of the inner tube is preferably generally channel-shaped in cross-section, with a generally inward presentation, and is preferably, but not necessarily, discontinuous from the helical corrugations 28. Such preferred inwardly-presenting, channel-shaped configuration allows a sealing member 36 to be disposed within the generally channel-shaped annular portion 34. The sealing member 36 is adapted to sealingly engage the cylindrical portion 46 of the nipple member 40 and is disposed between at least a portion of the annular portion 34 and the cylindrical portion 36.

The shrink fitting assembly 50 includes a collar 52 coaxially disposed around the outer tube 14 and having inwardly depending tabs 54 adapted to threadably engage the exterior of the helically-wound configuration of the outer tube. Thus, when the collar is threadably moved along the outer tube 14 into a generally circumscribing relationship with both the conduit assembly and the nipple member 40, the collar 52 compressingly urges the annular portion 34 and the sealing member 36 into a sealing relationship with the cylindrical portion 46 of the nipple member. Preferably, the collar 52 includes a knurled ring 56 connected thereto by means of tabs 58 in order to facilitate the threadable rotation of the collar 52 on the outer tube 14.

As is also illustrated in FIG. 3, the shrink fitting assembly 50 preferably includes a compression sleeve 62 coaxially disposed between the outer tube 14 and the annular portion 34 of the inner tube 12. The compression sleeve 62 includes a generally cylindrical main body portion 64 having a cross-sectional shape for complementary circumscribing engagement of the outer surface of the annular portion 34 of the inner tube. The body portion 64 is of a split-ring configuration having a separation on one side of its wall with an arcuate extension 66 spirally extending from one end of the separated body portion 64. The arcuate extension 66 circumferentially and slidably engages the outer surface of the remainder of the body portion 64 such that when the compression sleeve 62 is radially inwardly compressed, the arcuate extension 66 circumferentially slides along the outer surface of the body portion 64 to allow the diameter of the compression sleeve 62 to be compressingly reduced. Therefore, when the collar 52 is threadably moved along the outer surface of the outer tube 14 into a generally circumscribing relationship with the conduit assembly 10 and the nipple member 40, as described above, the compression sleeve 62, the annular portion 34 of the inner tube and the sealing member 36 are compressed in a radially inward direction in order to urge the annular portion 34 and the sealing member 36 into a sealing relationship with the cylindrical portion 46 of the nipple member 40. Preferably, the compression sleeve 62 is composed of either a deformable metal or deformable plastic material, or other suitable deformable materials known to those skilled in the art. The compression sleeve 62 also includes a helical end portion 68 having a configuration that is complementary to, and threadably engageable with, the helical corrugations of the inner tube 12 for purposes of further anchoring the inner tube 12 to the nipple member 40.

The tubular conduit assembly 10 is connected to the nipple member 40 by threading the collar 52 over the conduit assembly 10 to a position some distance away from its open end. The inner and outer tubes 12 and 14, respectively, are slidably inserted over the ramped bead 44 and the cylindrical portion 46 of the nipple member 40, and the collar 52 is then threadably moved into the above-discussed circumscribing relationship with the nipple member in order to compress the compression sleeve 62, the annular portion 34 and the sealing member 36 against the cylindrical portion 46 of the nipple member 40. Such compression reduces the diameter of the compression sleeve 62 such that it and the inner tube are prevented from passing over the ramped bead 44, thereby securing the conduit assembly to the nipple member.

FIGS. 5 through 8 illustrate a second embodiment of a tubular conduit assembly 110 as shown. Tubular conduit assembly 110 is similar to the tubular conduit assembly 10, and the reference numerals for the corresponding components have been primed and the differences are discussed below.

In FIG. 5, a tubular conduit assembly 110 includes a flexible, thin-walled inner tube 12' and a flexible armor or outer tube 14' coaxially disposed around the inner tube 12'. The outer tube 14' is constructed substantially in the same manner as the outer tube 14 of the first embodiment and a further discussion of the outer tube 14' would be redundant.

The inner tube 12' is preferably composed of a suitable plastic material such as nylon 11, nylon 12, or nylon 6–12. The inner tube 12', has characteristic properties which enable it to melt and bond to metallic materials. The inner tube 12' has significant sheer strength and tensile strength characteristics. The inner tube 12' also has sufficient characteristics to accommodate expansion and elongation of the inner tube 12'. The inner tube 12' extends a substantial distance out of the conduit 14' and preferably has a smooth outer surface.

A sleeve 112 is positioned coaxially around a portion of the inner tube 12' which extends from the conduit 14'. The sleeve 112 has an overall cylindrical shape, with a flange 114 on one end and an expanded member 116 on the other end of the sleeve. The sleeve 112 provides for adapting a nipple member 40' to the conduit 14' for conveying pressurized fluid. The flange 114 is preferably a thread segment flange having at least one thread, adapted for coupling the sleeve 112 with the conduit 14'. The expanded member 116, preferably an enlarged cylindrical portion, provides support to the inside surface of the outer conduit 14' at the connection of the nipple member 40' to the conduit 14'. This connection prevents decoupling of the interlocking channel-shaped portions 16' and 18' during severe bending, or as a result of the crimping, or swaging.

The conduit assembly 110 is connected to a nipple member 40' of a fluid-containing device. The nipple member 40' has an overall cylindrical shape having a plurality of decreasingly sized concentric cylindrical projections 120. The last elongated cylindrical projection 122, referred to as a tail, provides for connection of the nipple member 40' to the inner tube 12'. The tail 122 has a diameter which is suitably larger than the inner tube's inner diameter, for insertion into the inner tube 12'.

The conduit 14' has collar means 118, preferably a ferrule, having an overall cylindrical shape and having a diameter slightly larger than that of the conduit 14', enabling the collar means 118 to be positioned coaxially around the outer surface of the conduit 14'. The collar means 118 has a coupling end 124, having a threaded female segment 126 having at least a one-thread segment. The one-thread female segment 126 provides for the coupling of the sleeve 112, at its flange portion 114, to the collar means 118 on the conduit 14'. The collar means 118 has a remaining portion 128 which provides an area for securing the collar means to the conduit 14'. The collar means 118 is preferably secured to the conduit 14' by crimping, however, any conventional means could be used such as threads and the like.

In FIG. 6 the inner tube 12' is shown with the sleeve 112 positioned coaxially around the inner tube's outer diameter and having the nipple tail 122 positioned coaxially in the inner tube's inner diameter. The nipple tail 122 is slightly tapered to enable a secure fit in the inner diameter of the inner tube 12'. The sleeve 112 has a tapering portion 130 between the flange 114 and expanded member 116 for interlocking the nipple tail 122 within the sleeve 112. The sleeve tapered portion 130 secures the inner tube 12' onto the nipple tail 122 under a fairly uniform compression.

The nipple tail 122 is inserted and positioned into the inner diameter of the inner tube 12'. The sleeve 112 is positioned coaxially to and slid over the nipple tail 122 and inner tube 112 compressing the inner tube 12' onto the outer surface of the nipple tail 122. A conventional heating source, preferably an induction heater work coil (not shown), is placed around the sleeve 112 between the flange 114 and the enlarged portion 116, for applying heat to the sleeve member 112. The induction heater coil is energized, by applying radio frequency current to the work coil, thus heating the coil. The temperature of the coil is sufficient to melt the inner tube 12', thus bonding the tail 122 and the sleeve 112 to the inner tube 12'. Provided that the nipple tail 12 and the sleeve 112 are sufficiently clean, the inner tube 12' will securely bond the metallic nipple and sleeve to the inner tube at an area 132 adjacent to the flange 114. The bonds between the nipple tail 122 and inner tube 12' and sleeve 112 will have significant sheer strength and will substantially prevent tensile tear failure.

The nipple 40' now bonded to the inner tube 12' and also to the sleeve 112, is inserted into the conduit 14' (best shown in FIG. 7). The collar means 118 is positioned in an interlocking relationship with the sleeve 112 via the threaded segments 114, 126. The coupling of the sleeve 112 to the collar means 118 is accomplished by inserting the sleeve 112 into the conduit 14' and screwing the collar means 118 around the flange 114 thus interlocking the collar means 118 to the sleeve 112. The collar means 118 is locked onto the nipple 40' and is ready to be secured to the conduit 14' (best seen in FIG. 7). The remaining portion 128 of the collar means 118 is preferably crimped to the outer surface of the conduit 14' securing the collar means 118 to the conduit 14'. The collar means 118 could also be secured to the conduit 14' by any other conventional means such as threads, welds and the like.

The second embodiment of the tubular conduit assembly provides for the forming of bends and the like in the conduit 14'. As shown in FIG. 8, the conduit 14' can be pre-formed into a predetermined specified arrangement. This pre-forming is accomplished by bending, turning, twisting or the like to shape the conduit 14' to the particular pre-formed configuration that is needed for a particular conduit. After the conduit 14' has been pre-formed to a desired configuration, a heated high-pressure fluid is injected into the conduit. The heated high-pressure fluid is at a temperature such that the thermoformed plastic inner tube 12' is permanently deformed. The heated high-pressure fluid forces the inner tube 12' into the channel portions 16', 18'. The inner tube 12' deforms into the channel portions 16', 18' forming interior pockets 136 in the inner tube 12'. The interior pockets 136 are permanently formed into the inner tube 12', however, the interior pockets 136 do not limit the flexibility of the conduit 14'.

The conduit now has a preferred orientation and configuration. However, if the pre-formed configuration is not properly formed, or needs to be altered, the conduit can be manipulated to a new desired configuration without loss of flexibility, strength, chemical properties or the like. If it is desired, the conduit could be completely staightened without loosing its characteristic properties. Furthermore, when, again, the desired pre-formed configuration is necessitated, the conduit can be reformed to its original pre-formed shape. When the conduit nears its pre-formed shape, the inner tube 12', having its interior pockets 136 acting as a memory, shifts the conduit into its original pre-formed shape. Thus, the conduit can be pre-formed to a specified arrangement, however, if desired, the conduit can be rearranged to another configuration, and can always be brought back to its original formation.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A tubular conduit assembly for conveying a presurized fluid, comprising:
   a flexible, thin-walled inner tube for conveying said pressurized fluid therethrough, said inner tube being helically corrugated and having an apex at each corrugated;
   a flexible outer tube disposed coaxially around said inner tube, said outer tube being constructed from at least one helically-wound member corresponding with and engaging the helical corrugation of said inner tube so that the apex of the helical corrugation of said inner tube nest inside the helical corrugation of said outer tube;
   said plastic inner tube being sufficiently flexible and thin-walled to deform in response to the pressure of said pressurized fluid such that said corrugations in said thin-walled inner tube substantially expand to form a substantially non-corrugated sealing layer on the interior of said outer tube and said inner tube returning to said corrugated configuration when said pressurized fluid ceases to flow through said conduit.

2. A tubular conduit assembly according to claim 1, wherein said helically-wound member of said outer tube includes at least two alternately-facing generally channel-shaped portions, said generally channel-shaped portions being helically wound together in slidable engagement with one another.

3. A tubular conduit assembly according to claim 2, wherein each of said generally channel-shaped portions has one of its legs slidably interposed between the legs of its adjacent generally channel-shaped portion.

4. A tubular conduit assembly according to claim 1, further comprising:
   an integral annular portion located adjacent at least one end of said flexible inner tube, said end of said inner tube being adapted to receive a nipple member inserted therein; and
   shrink fitting means for compressingly urging said annular portion into a sealing relationship with said nipple member and for anchoring said outer tube with respect to said nipple member.

5. A tubular conduit assembly according to claim 4, wherein said annular portion is generally channel-shaped in cross-section, with a generally inward presentation, and is discontinuous from said helical corrugations of said inner tube, said conduit further including sealing means disposed within said inwardly-presenting annular portion and sealingly engaging said nipple member.

6. A tubular conduit assembly according to claim 4, wherein said shrink fitting means includes a collar coaxially circumscribing and threadably engaging said outer tube, and a compression sleeve coaxially circumscribing said annular portion and being disposed between said annular portion and said outer tube, said collar being adapted to radially compress said compression sleeve and thereby urge said annular portion into said sealing relationship with said nipple member when said collar is threaded along said outer tube into a generally circumscribing relationship with said compression sleeve and said annular portion.

7. A tubular conduit assembly according to claim 6, wherein said annular portion is generally channel-shaped in cross-section, with a generally inward presentation, and is discontinuous from said helical corrugation of said inner tube, said conduit assembly further including sealing means disposed within said inwardly-presenting annular member and sealingly engaging said nipple member.

8. In a tubular fluid conduit assembly adapted to be connected to a nipple member, said conduit assembly having an outer tube constructed from a corrugated helically-wound member and a flexible inner tube coaxially disposed in said inner tube, the improvement comprising:
   shrink fitting means for connecting said conduit assembly to said nipple member in a sealing relationship therewith, said shrink fitting means including a collar coaxially disposed around said outer tube and threadably engaging said helically-wound member the collar including members that threadably engage the corrugations of said helically-wound outer tube; and
   a compression sleeve coaxially disposed between said outer and inner tubes adjacent an end of said conduit assembly, and end portion of said inner tube being coaxially disposed between said compression sleeve and said nipple member;
   said compression sleeve and said end portion of said inner tube being radially compressed when said collar is threadably moved into a circumscribing relationship with said compression sleeve and with said end portion of said inner tube, thereby sealingly urging said end portion of said inner tube against said nipple member.

9. The improvement according to claim 8, further comprising sealing means disposed between at least part of said end portion of said inner tube and said nipple member, said sealing means being sealingly compressed against said nipple member when said collar is threadably moved into said circumscribing relationship.

10. The improvement according to claim 9 wherein said compression sleeve is composed of a deformable metal.

* * * * *